(12) United States Patent
Circello et al.

(10) Patent No.: US 8,417,924 B2
(45) Date of Patent: Apr. 9, 2013

(54) DATA PROCESSING DEVICE AND METHOD OF HALTING EXCEPTION PROCESSING

(75) Inventors: Joseph C. Circello, Phoenix, AZ (US); Daniel M. McCarthy, Phoenix, AZ (US); David J. Schimke, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 433 days.

(21) Appl. No.: 12/035,969

(22) Filed: Feb. 22, 2008

(65) Prior Publication Data

US 2009/0217011 A1    Aug. 27, 2009

(51) Int. Cl.
    *G06F 9/44*    (2006.01)
(52) U.S. Cl.
    USPC .......................................................... 712/244
(58) Field of Classification Search ........................ None
    See application file for complete search history.

(56) References Cited

U.S. PATENT DOCUMENTS

| | | | |
|---|---|---|---|
| 5,878,264 A | 3/1999 | Ebrahim | |
| 5,901,309 A | 5/1999 | Hammer et al. | |
| 5,943,498 A * | 8/1999 | Yano et al. | 717/128 |
| 6,205,560 B1 * | 3/2001 | Hervin et al. | 714/34 |
| 6,564,339 B1 * | 5/2003 | Swoboda et al. | 714/30 |
| 6,618,779 B1 | 9/2003 | Branch | |
| 2003/0074545 A1 | 4/2003 | Uhler | |
| 2004/0268103 A1 | 12/2004 | Shelor | |
| 2007/0234020 A1 | 10/2007 | Jensen | |
| 2008/0115011 A1 * | 5/2008 | Codrescu et al. | 714/38 |
| 2009/0217298 A1 | 8/2009 | Circello et al. | |

OTHER PUBLICATIONS

Freescale Semiconductor, Inc., "Chapter 18, Version 1, ColdFire Debug," Reference Manual: MCF51QE128, MCF51QE64, MCF51QE32—ColdFire Microcontrollers, Rev. 3, Sep. 2007, www.freescale.com; pp. 355-421.

Non-Final Office Action mailed Nov. 3, 2011 for U.S. Appl. No. 12/035,967, 18 pages.

* cited by examiner

*Primary Examiner* — Jacob A Petranek

(57) ABSTRACT

A processor begins exception processing in response to an exception event. Exception processing by the processor is halted during exception processing to facilitate debugging. The exception event can be a reset exception event or an interrupt exception event. Normal exception processing by the data processor can be resumed after debugging, or exception processing by the data processor can be aborted to allow the normal execution of instructions by the data processor to resume. An exception event can be selectively treated as an interrupt or a reset.

21 Claims, 7 Drawing Sheets

| | DESCRIPTION | DEFAULT | PGM |
|---|---|---|---|
| LOC1 | H_COP | 0 → NORMAL<br>1 → HALT | 0 |
| LOC2 | H_EXT_EXCP | | 0 |
| LOC3 | H_ILL_INST | | 1 |
| LOC4 | H_ILL_ADDR | | 1 |
| LOC5 | EXCP_HALT_EN | 0 → DISABLE<br>1 → ENABLE | 1 |

DATA PROCESSING DEVICE AND METHOD OF HALTING EXCEPTION PROCESSING

CROSS-REFERENCE TO RELATED APPLICATION

The present disclosure is related to U.S. patent application Ser. No. 12/035,967, filed on an even date herewith and entitled "DATA PROCESSOR DEVICE SUPPORTING SELECTABLE EXCEPTIONS AND METHOD THEREOF," the entirety of which is incorporated by reference herein.

BACKGROUND

1. Field of the Disclosure

The present disclosure relates generally to data processing devices and methods and more particularly to processing an exception event at a data processing device.

2. Description of the Related Art

In data processor applications, certain events are treated as errors that result in the generation of a reset event to return the processor to a defined state. A reset event is traditionally treated by a data processor as a highest-priority exception and typically causes the processor to simply abort any application instructions that may be in execution, return the processor to a defined state, and resume application instruction execution, all without saving state information at the time the error event occurred. As a result, the events that lead up to the error event are difficult to evaluate. Therefore, a device and method that would assist with determining the events that led up to a reset event would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with one embodiment of the present disclosure, exception processing of an exception event by a data processor is halted to facilitate debugging. Exception processing by the data processor can be resumed after debugging, or exception processing by the data processor can be aborted to resume the processing of application instructions by the data processor. The exception type can be a reset exception or an interrupt exception.

In accordance with another embodiment of the present disclosure a selectable exception event can be selectively treated as an interrupt event or a reset event. Various embodiments of the present disclosure will be better understood with reference to FIGS. 1-9 herein.

Figure 1:
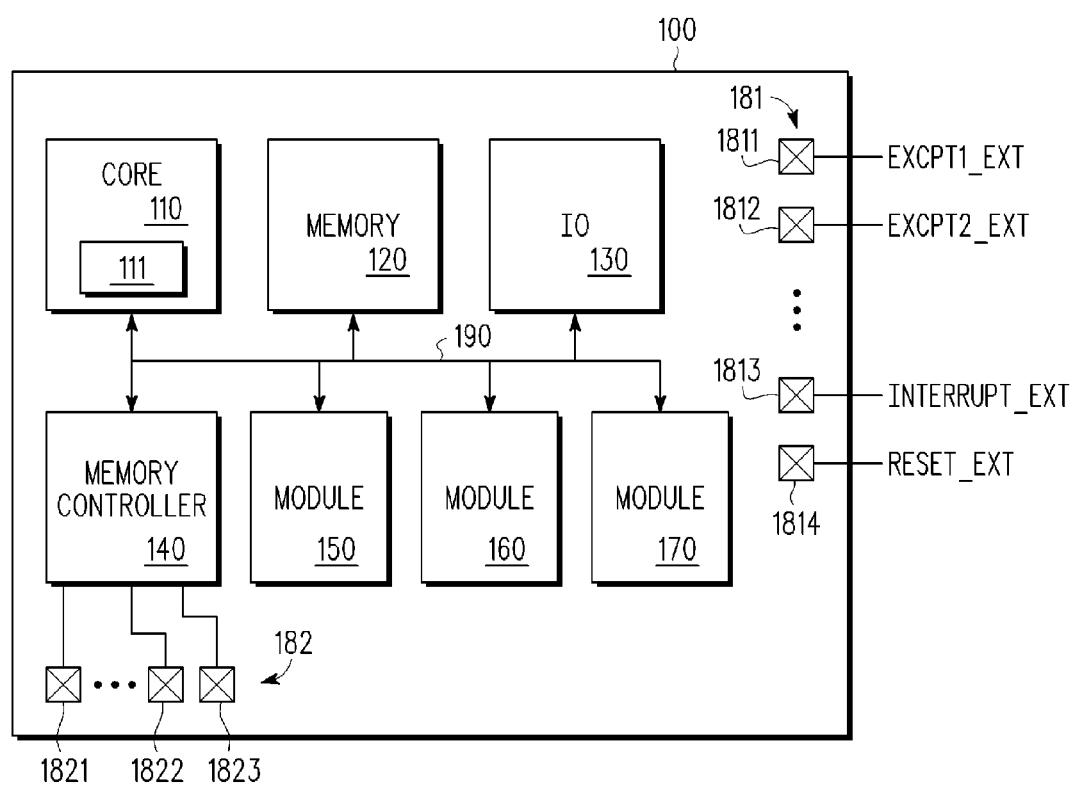
FIG. 1 illustrates a block diagram of data processor device in accordance with a specific embodiment of the present disclosure.

FIG. 1 illustrates a data processor device 10 that includes an integrated data processor device, referred to as data processor 100, formed at an integrated circuit device. Integrated processor 100 includes a plurality of modules that perform various functions. Data processor 100 is illustrated to include a core module 110, a memory module 120, an Input/Output (I/O) module 130, a memory controller module 140, module 150, module 160, and module 170. These modules are collectively referred to as modules 110-170. Data processor 100 is illustrated to include a plurality of external interface structures, such as input output pads (IO pads), including IO pads 181, and IO pads 182. Data processor 100 is also illustrated to include a set of interconnects 190.

The interconnects of the set of interconnects 190 are connected to each of the modules 110-170 in a manner to operationally facilitate communication between modules 110-170, including communications to implement various features of the integrated data processor 100 as described herein. For example, dedicated and shared interconnects associated with the set of interconnects 190 are used to connect each module of modules 110-170 to one or more other modules of the modules 110-170. The IO pads 181 include IO pads 1811-1814. Each IO pad of the IO pads 181 can be a shared IO pad or a dedicated IO pad. For example, an IO pad of the IO pads 181 can be connected to IO module 130, whereby signals received at IO module 130 from that IO pad would be provided to one or more of the other modules 110-170 via a shared interconnect of the set of interconnects 190, such as an interconnect associated with a shared bus. Alternatively, an IO pad of the IO pads 181 can be dedicated to a specific module, whereby received signals would be provided to one or more of the modules 110-170 over a dedicated interconnect. For example, the IO pads 182 include IO pads 1821-1823 that are dedicated to the memory controller module 140.

A discussion of various terms used herein is appropriate before further discussing operation of the data processor 100 of FIG. 1.

As used herein the term "exception" is intended to generically refer different types of exceptions associated with one or more exception events. For example, a reset is one type of exception, an interrupt is another type of exception, and a selectable exception, as discussed herein, is yet another type of exception.

As used herein, the term "exception event" is intended to generically refer to a specific event that can cause an exception. For example, applying power to an integrated circuit is one example of an exception event that can cause an exception at a data processor device. The occurrence of an exception event is typically indicated by asserting a signal to a defined state.

As used herein, the term "reset" and the term "reset exception" are intended to generically refer to an exception that causes an operational redirect of processing at a data processor that is not dependent upon event sampling before an exception processing routing of the data processor is executed to process the event causing the reset. For example, a reset will cause a data processor to execute an exception processing routine to process an event causing the reset without first being authorized by a sampling operation.

As used herein, the term "interrupt" and the term "interrupt exception" are intended to generically refer to an exception that must be authorized by a sampling operation before an exception processing routine of the data processor is executed to process the event causing the interrupt. For example, an application instruction being executed by a data processor during normal instruction processing can have a sample point at which interrupts are detected and authorized. Such a sampling operation can occur as part of the instruction's execution, between instruction execution, and the like.

Referring back to FIG. 1, IO pads 1811-1814 receive various exception signals. IO pad 1811 receives an exception signal labeled EXCP1_EXT that is associated with a generic exception event that occurs external the data processor device 100. IO pad 1812 receives an exception signal labeled EXCP2_EXT that is associated with a different generic exception event that occurs external the data processor device 100. IO pad 1813 receives an exception signal labeled INTERRUPT_EXT that is associated with a generic interrupt event that occurs external the data processor device 100. IO pad 1814 receives an exception signal labeled RESET_EXT that is associated with a generic reset event that occurs external the data processor device 100. Signals EXCP1_EXT and EXCP2_EXT can represent any exception type, such as an interrupt, reset, or selectable exception as further described herein.

The exception signals received at IO pads 181 are received at and processed by exception module 111 of core module 110, as further described herein. It will be appreciated that exception module 111, as well as any of the other modules described herein, can be implemented as part of other modules of data processor 100 or as separate modules of data processor 100.

Figure 2:
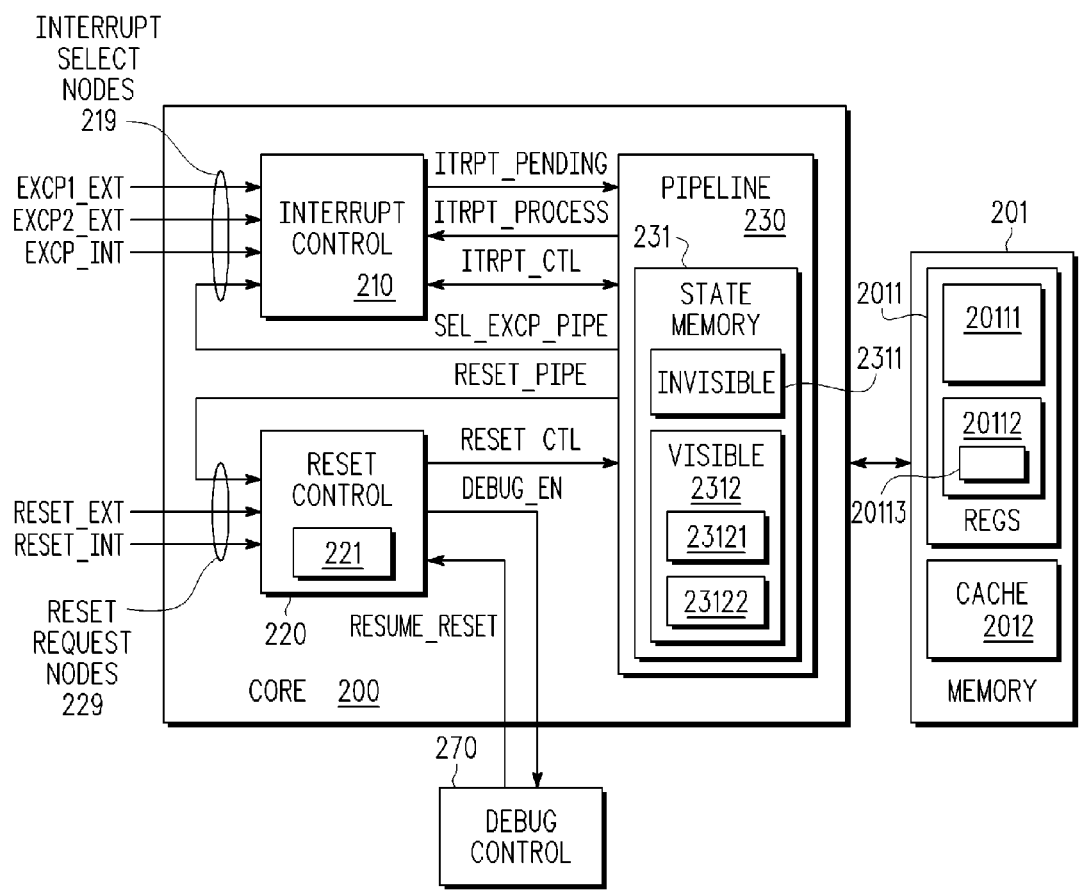
FIG. 2 illustrates a block diagram of a specific embodiment of a portion of the data processor device of FIG. 1.

FIG. 2 illustrates a core 200 and memory 201. Core 200 represents a specific embodiment of core 110 of FIG. 1, which is also referred to as a central processor unit (CPU). Memory 201 represents data storage locations associated with memory module 120, Core 110, and other modules of data processor 100.

Core 200 includes interrupt controller module 210, reset controller module 220, and pipeline module 230. The combination of interrupt controller module 220 and reset controller module 220 form an exception processing module. Interrupt controller module 210 is connected to the following nodes: a node that communicates a signal labeled EXCP1_EXT; a node that communicates a signal labeled EXCP2_EXT; a node that communicates a signal labeled EXCP_INT; a node that communicates a signal labeled SEL_EXCP_PIPE; a node that communicates a signal labeled ITRPT_CTL; a node that communicates a signal labeled ITRPT_PROCESS; and a node that communicates a signal ITRPT_PENDING.

The signal EXCP_INT is associated with a generic interrupt event that occurs internal to the data processor 100, and can be a selectable or non-selectable exception, i.e., a fixed interrupt exception event. Signals EXCP1_EXT and EXCP2_EXP are associated with generic exception events that occur external the data processor 100, and can be selectable or non-selectable exceptions. The signal SEL_EXCP_PIPE is associated with a generic interrupt event that occurs at pipeline 230, and is a selectable exception. The signal ITRPT_PENDING is asserted by interrupt controller module 210 to communicate to the pipeline 230 that an interrupt event is pending that needs to be authorized by the pipeline 230. Signal ITRPT_PROCESS is asserted by the pipeline to indicate the pending interrupt is authorized and can be processed. Signal INT_CTL communicates information between the interrupt controller module 210 and the pipeline 230 during exception processing of the data processor 100. Note that each interrupt event can be associated with a different node of the interrupt event nodes 219, alternatively interrupt events can share an interrupt event node.

Reset control module 220 is connected to the following nodes: a node that communicates a signal labeled RESET_PIPE; a node that communicates with signal RESET_EXT; a node that communicates a signal labeled RESET_INT; a node that communicates a signal labeled RESET_CTL; a node that communicates a signal labeled DEBUG_EN; and a node that communicates a signal RESUME_RESET.

The signal RESET_EXT is associated with a generic interrupt event that occurs external to the data processor 100 that is a non-selectable exception, i.e. a fixed reset exception event. The signal RESET_INT is associated with a generic reset event that occurs internal to the data processor 100 that is a non-selectable exception. The signal RESET_PIPE is associated with a generic reset event that occurs internal to the data processor 100 at pipeline 230, and is a non-selectable exception. DEBUG_EN is a signal that when asserted by reset control module 220 enables debugging at debug control module 270. RESUME_RESET is a signal asserted by the debug control module 270 to resume reset processing at core 200 in response to completion of debug processing. Signal RESET_CTL communicates information between the reset control module 220 and the pipeline 230 during exception processing of the data processor 100 including information used to halt the pipeline from processing further instructions.

Pipeline 230 is connected to the following nodes: the node that communicates signal SEL_EXCP_PIPE; the node that communicates signal ITRPT_CTL; the node that communicates signal RESET_PIPE; the node that communicates signal ITRPT_PROCESS; the node that communicates signal ITRPT_PENDING; and the node that communicates signal RESET_CTL.

Pipeline 230 receives, decodes and executes application instructions that can be stored at internal or external memory. State memory 231 of pipeline 230 represents locations of pipeline 230 where state information is stored. State memory 231 includes portion 2311 and portion 23 12. Portion 2311 represents state information having a specific characteristic, such as state information that is program model invisible, i.e., not observable external to the integrated circuit that includes pipeline 230 during normal operation where application instructions are being executed. Portion 2312 represents state information that can have a characteristic that is mutually exclusive to the characteristic of state information of portion 2311, such as state information that is program model visible during normal operation where application instructions are being executed, i.e., observable external to the data processor 100. For example, memory 23121 represents a program counter of pipeline 230, and memory 23122 represents a status register of pipeline 230, both of which are program model visible for purposes of discussion herein.

The term "application instructions" as used herein is intended to mean a sequence of instructions to be executed at data processor device having defined characteristics. Examples of application instructions include low-level applications and high-level applications associated with a low-level application. For example, a low level application can be an operating system, such as Windows Vista, or a dedicated application, such as an application used to implement an engine controller, that accesses features of a data processor 100 directly. A high level application, such as Microsoft® Word for Windows, interfaces with a lower level application.

Debug controller module 270 implements a debug routine that can receive, and execute, debug commands from external to the data processor 100, to access information at, and control operation of, various modules of the processor device 100.

Memory 201 represents memory that can include portions of memory module 120 as well as storage locations, such as register or cache, dedicated to core 200 other than that represented by memory 231. Memory 201 includes portion 2011 and portion 2012. Portion 2011 represents register locations of data processor device 100 that control various operations of data processor device 100. Memory 20111 represents a portion of memory 2011 that is invalidated during reset. Memory 20112 represents a portion of memory 2011 that is maintained during reset. Cache 2012 represents one or more levels of cache memory used to support operation of data processor 100. Operation of the exception processing of core 200 of FIG. 2 will be better understood with reference to FIG. 3.

Figures 3, 4:
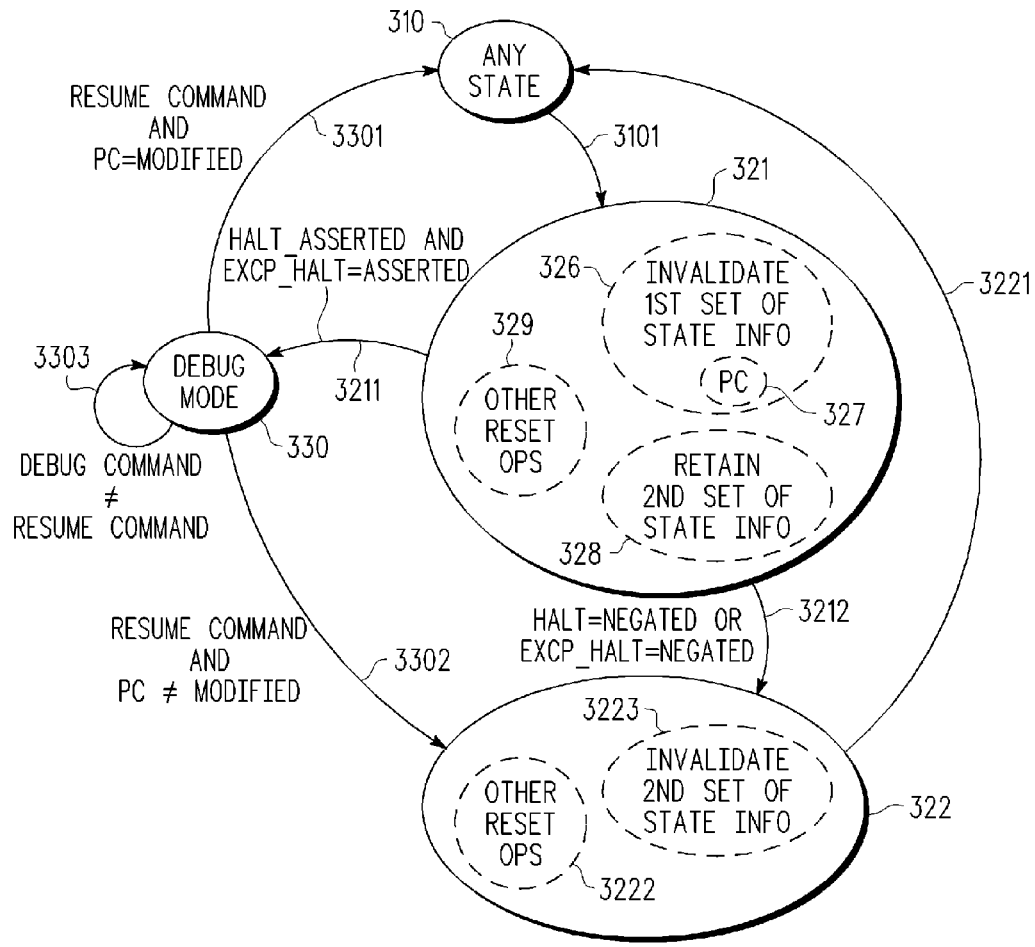
FIG. 3 illustrates a state diagram relating to the block diagram of FIG. 3 in accordance with a specific embodiment of the present disclosure.
FIG. 4 illustrates a table representing various programmable indicators in accordance with a specific embodiment of the present invention.

FIG. 3 illustrates a state diagram describing operation of a data processor 100 including a core, such as the core 200 previously described. The state diagram of FIG. 3 includes state node 310, state node 321, state node 322, state node 330, state transition indicator 3101, state transition indicator 3211, state transition indicator 3212, state transition indicator 3221, state transition indicator 3301 and state transition indicator 3302. State node 321 and state node 322 represent an exception processing mode of operation that can be a reset processing mode of operation, an interrupt mode of operation, or a combination of both reset and interrupt processing modes. State node 321 and 322 are primarily described herein as being associated with a reset mode of operation.

State node 310 represents any operating mode of data processor 100, including execution of application instructions, except for exception processing modes otherwise illustrated at FIG. 3. In response to a state occurring at state node 310 that indicates an authorized exception event has occurred that is haltable, the data processor 100 will enter an exception processing mode of operation at state node 321. For example, assertion of one of the reset signals associated with the reset request nodes 229 will cause the data processor 100 to enter reset processing mode of operation at state node 321. The exception processing routine performed at state node 321 is associated with reset controller 220 of the data processor of FIG. 2. Note that reset events are authorized when they occur, while interrupt events require further qualification before being authorized. When the exception event is a reset the transfer to state node 321 is authorized with no additional qualification.

Various portions 326-329 of the exception processing routine associated with state node 321 are illustrated, where each portion performs a function during exception processing by the data processor device 100. At portion 326, which includes portion 327, various state information is invalidated. Existing state information can be invalidated by being replaced, e.g., by being set to specific logic states, or by asserting a flag that would indicate the state information associated with the flag is not valid and, therefore, is not to be used. Portion 326 invalidates state information of pipeline 230. In one embodiment, only non-visible state information of pipeline 230, e.g., some or all of state information 2311, is invalidated at portion 321. At portion 327 the program counter is invalidated. In one embodiment, a flag can be set to indicate the program counter is invalidated, while in another embodiment the program counter is invalidated by being loaded with an address where normal instruction processing will begin upon normal completion of the exception processing routine either by processing a vector location or by processing an instruction location. Note that with respect to a reset the address will typically be a fixed address that does not vary and represents a vector location or an instruction location, while with respect to an interrupt, the address will typically represent a vector location that is determined based upon an interrupt vector associated with the event causing the interrupt.

At portion 328 various state information of the data processor is maintained during exception processing of node 321. In other words, the exception processing routine at state node 321 does not change state information of portion 328. It will be appreciated that portion 328 is not necessarily an active routine separate from portion 326 and portion 327, but instead represents the fact that some state information can be invalidated while other state information is retained. Other exception operations can be performed at 321 and are represented by portion 329. For example, various visible state information can be invalidated or maintained, state information, whether visible or invisible, can be preserved by being stored at an alternate location prior to being invalidated, and the like.

Upon completion the exception processing routine represented by state node 321, a state transition based upon a state of a programmable indicator will occur to either halt the data processor 100, for example in a debug mode, at state node 330, or to continue exception processing at state node 322.

Various types of programmable indicators can be used to control whether data processor enters the state represented by state node 330 or the node 321. For example, programmable indicators can be implemented by fuses, external pins, register locations, and the like. FIG. 4 illustrates a table representing a programming model that includes register bits at locations LOC1-LOC4 associated with various exception events. For example location LOC1 represents an address and location of a bit referred to as H_COP that is associated with a Computer Operating Properly (COP) exception event that generates an exception event if a counter is not periodically accessed by software.

As illustrated at FIG. 4, when bit H_COP has a value of one the core 200 is to be halted in response to a COP exception event, and when bit H_COP has a value of zero the core 200 is not to be halted when responding to a COP exception event, but is to continue exception processing normally until completion. It will be appreciated that other programmable indicators can further qualify how flow from state node 321 proceeds. For example, an enable bit EXCP_HALT_EN at location LOC 5 can globally enable or disable the exception halt feature for each of the other haltable exception events of the table of FIG. 4.

The table of FIG. 4 also illustrates the following: a location LOC2 that represents an address and location of a bit referred to as H_EXT_EXCP that is associated with an exception event external the integrated circuit that includes the core 200; a LOC3 represents an address and location of a bit referred to as H_ILL_INST that is associated with an exception event that is generated internal the data processor 100 that indicates an illegal instruction has been detected; a location LOC4 that represents an address and location of a bit referred to as H_ILL_ADDR that is associated with an exception event that is generated internal the data processor 100 that indicates an illegal address has been detected. The various exception events associated with the locations of the table of FIG. 4 can be all reset events, all interrupt events, or a combination thereof, depending upon the specific implementation of data processor 100.

As discussed above, data processor 100 will halt exception processing in response to the programmable indicator for a specific exception type indicating exception processing is to be halted. Alternatively, the data processor will continue exception processing by the exception processing routine in response to the programmable indicator for the specific exception type indicating exception processing is not to be halted.

FIG. 3 illustrates halting exception processing of the data processor device by transition to the debug mode of state node 330, and continuing exception processing by transitioning to state node 322 of the exception processing routine. In the specific embodiment illustrated state node 330 represents a debug mode of operation that halts operation of core 200.

At state node 322, in response to the state of the data processor 100 indicating that exception processing is to continue, additional state information of the data processor 100 is invalidated. For example, at portion 3223 of the exception processing routine at state node 322 a set of information associated with a portion of a data processor, such as data processor visible state information, can be replaced with a defined set of information to facilitate the core 200 returning to normal instruction processing. The defined set of information can be programmable, i.e., modifiable by application instructions, or non-programmable, also referred to as fixed, i.e., not modifiable by application instructions. It will be appreciated that by not invalidating state information associated with portion 3223 prior to halting debug processing, it is possible for the state information invalidated during reset, i.e., the information at portion 3223, to be accessed while the data processor is halted at state node 330 as discussed below. For example, an exception event having its programmable halt indicator asserted will be halted prior to destroying information associated with the portion 3223 of the exception processing routine, while an exception event having its programmable bit negated will continue the exception processing routine at node 322.

Portion 3222 of the exception processing routine associated with node 322 perform other operations associated with exception processing.

At node 330 when the state of data processor 100 indicates that exception processing is to be halted, a debug mode of operation is entered. As used herein the term "debug mode of operation" is intended to refer to a state of a microprocessor during which information at data processor can be accessed, and during which execution of application instructions has been halted. In one embodiment, the debug mode of operation allows for receipt of external debug commands, other than a resume command that exits debug mode of operation, as indicated by transition arrow 3303. Execution of debug commands cause various debug operations to be executed, and can be used to read and write various visible states information of the data processor, including state information of the pipeline 230. For example, a user using the debug routine at node 330 can evaluate state information that would have been destroyed at portion 3223 of node 322. The ability to access information that would be lost during an exception routine that cannot be halted provides additional flexibility to engineers and programmers debugging a design.

A specific debug command can be issued to exit the debug state. As used herein the term "resume command" is intended to refer a command that terminates a debug mode of operation. Upon executing a resume command the processor will either enter normal operating mode at state node 310 as indicated by state transition indicator 3301, or resume exception processing at state node 322 as indicated by state transition indicator 3302. In one embodiment, whether a normal mode of operation is entered, or whether exception processing is resumed when a resume command is received is determined based upon whether the program counter was modified during debug processing. For example, reset processing by the data processor will be resumed if a flag asserted at state node 321 to invalidate the program counter remains asserted, or if a value written to the program counter during state node 321 has not been changed. If the program counter was modified during debug, the resume command will cause the data processor to being normal instruction operation at an instruction associated with the newly stored program counter.

It will be appreciated that a portion of the exception processing routine, not illustrated, that processes a fixed reset event would invalidate the information indicated at portion 327 of state node 321 and then place a portion the data processor at the defined state.

Figure 5:
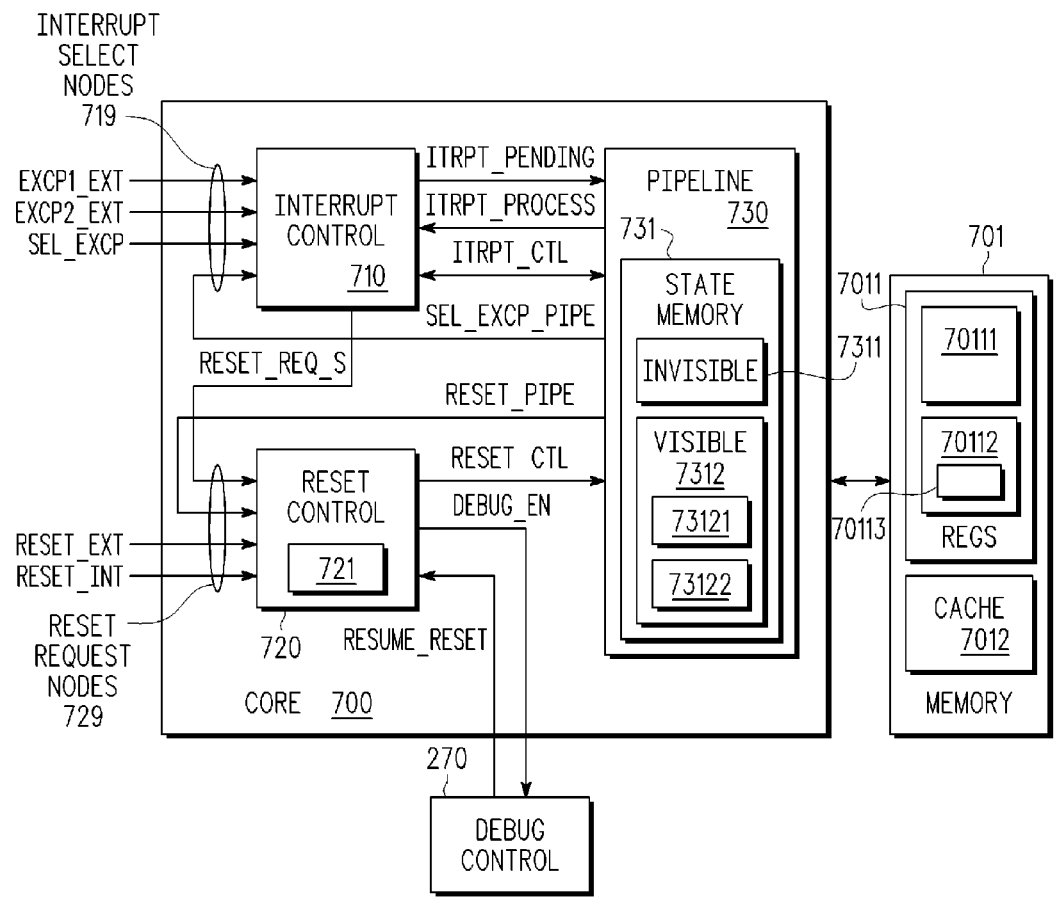
FIG. 5 illustrates a block diagram of a specific embodiment of a portion of the data processor device of FIG. 1.
Figure 6:
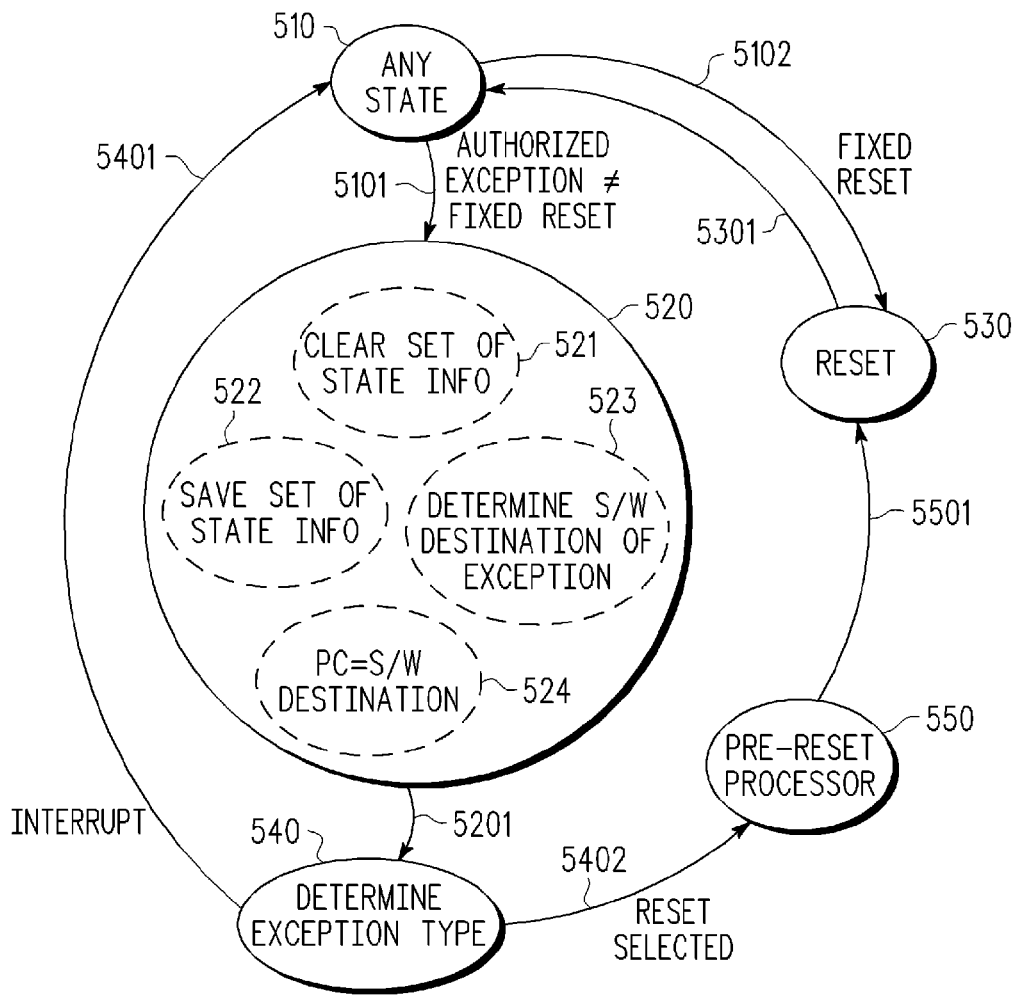
FIG. 6 illustrates a state diagram relating to the block diagram of FIG. 5 in accordance with a specific embodiment of the present disclosure.
Figure 7:
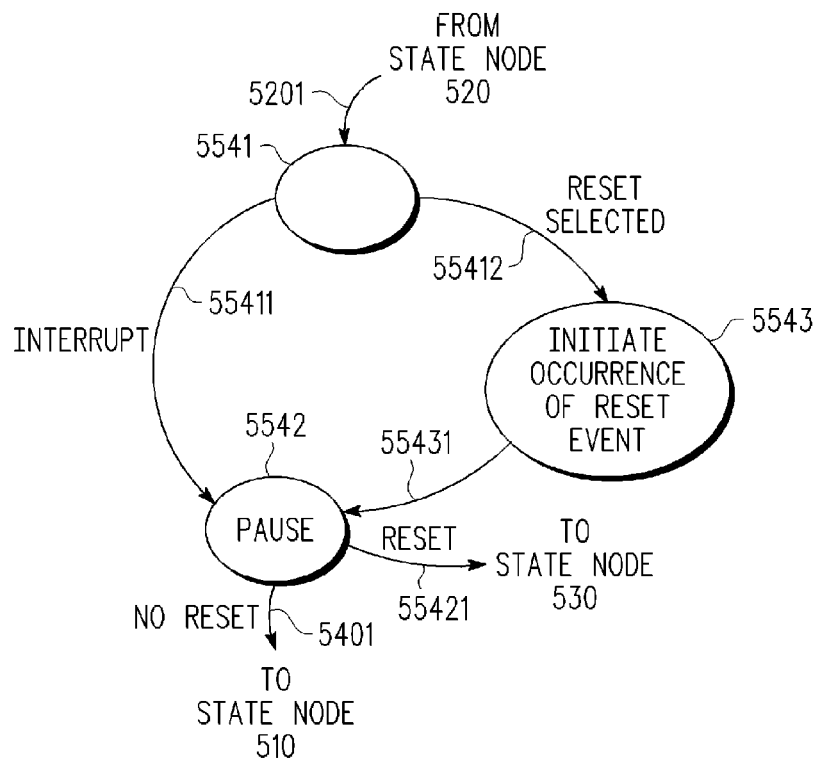
FIG. 7 illustrates a more detailed state diagram relating to a portion of the state diagram of FIG. 6.
Figure 8:
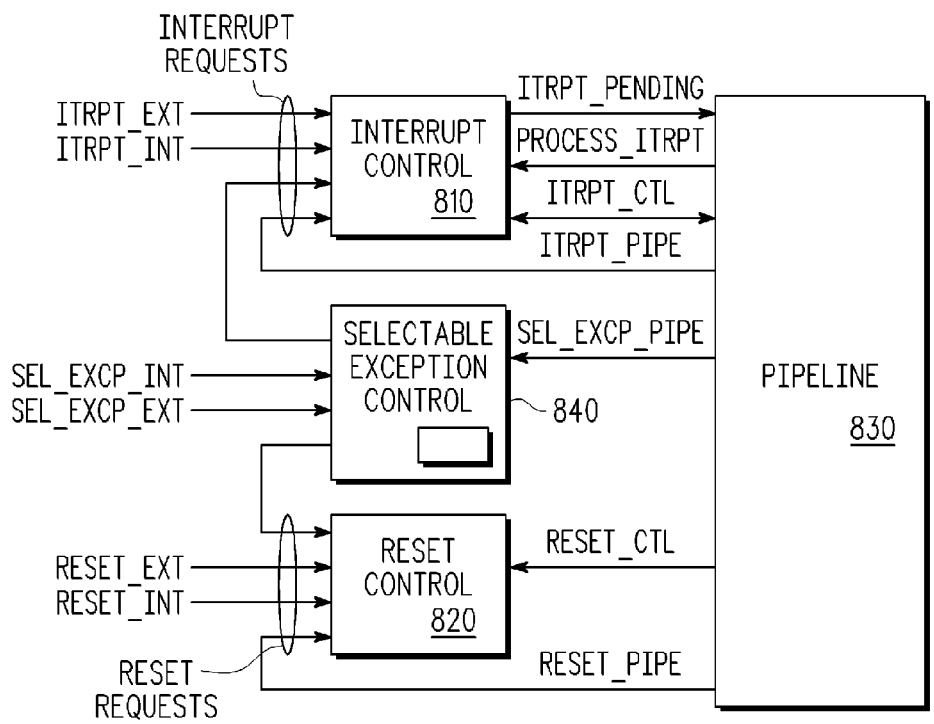
FIG. 8 illustrates a block diagram of a specific embodiment of a portion of the data processor device of FIG. 1.
Figure 9:
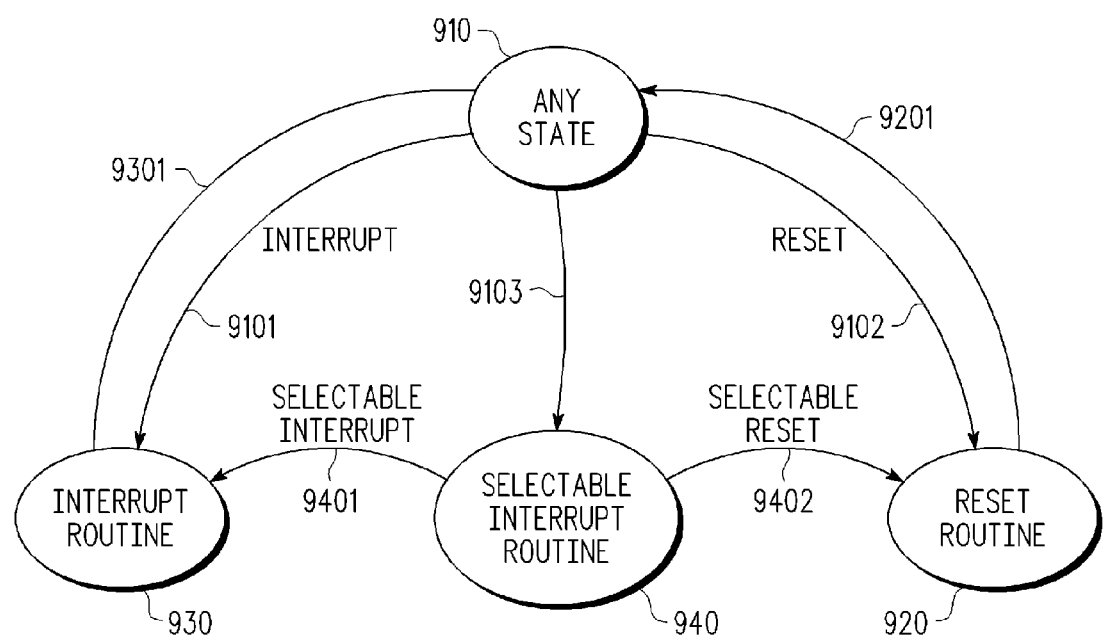
FIG. 9 illustrates a state diagram relating to the block diagram of FIG. 5 in accordance with a specific embodiment of the present disclosure.

FIGS. 5-9 illustrate other embodiments of the present disclosure whereby an exception event that is a selective exception event can selectively be treated as an interrupt event or a reset event. FIGS. 5-7 illustrate an embodiment whereby a selective reset associated with a selective exception event occurs gracefully to preserve certain state information at the time the selective exception occurred. FIGS. 8-9 illustrate an embodiment whereby a selective reset associated with the selective exception event occurs in a more traditional, less graceful, manner.

FIG. 5 illustrates a core 700 and a memory 701. Core 700 can represent a specific embodiment of Core 110 of FIG. 1. Memory 701 can represent portions of memory associated with memory module 120 and portions of memory dedicated to operation of Core 700. Core 700 includes interrupt controller module 710 reset controller module 720, and pipeline module 730.

Interrupt control module 710 is connected to the following nodes: a node that communicates signal EXCP1_EXT; a node that communicates signal EXCP2_EXT; a node that communicates a signal labeled SEL_EXCP; a node that communicates a signal labeled SEL_EXCP_PIPE; a node that communicates a signal labeled RESET_REQ_S; a node that communicates a signal labeled ITRPT_CTL; a node that communicates a signal labeled ITRPT_PROCESS; and a node that communicates a signal ITRPT_PENDING.

Signals associated with the interrupt control module 710 having the same name as signals described with reference to FIG. 2 operate in the same manner. The signal SEL_EXCP is a selectable exception that is user configurable to operate as an interrupt or a reset.

Reset control module 720 is connected to the following nodes: a node that communicates signal RESET_PIPE; a node that communicates a signal labeled RESET_REQ_S; a node that communicates a signal labeled RESET_EXT; a node that communicates a signal labeled RESET_INT; a node that communicates a signal labeled RESET_CTL; a node that communicates a signal labeled DEBUG_EN; and a node that communicates a signal labeled RESUME_RESET.

Signals associated with the reset control module 710 having the same name as signals described with reference to FIG. 2 operate in the same manner.

Pipeline 730 is connected to the following nodes: the node that communicates signal SEL_EXCP_PIPE; the node that communicates signal ITRPT_CTL; the node that communicates signal RESET_PIPE; the node that communicates signal ITRPT_PROCESS; the node that communicates signal ITRPT_PENDING; and the node that communicates signal RESET_CTL.

Signal SEL_EXCP provides an indication when an associated event has occurred. In addition, the signal SEL_EXCP is associated with a specific interrupt vector that indicates the exception type. The exception vector can be provided as part of the signal SEL_EXCP, be a defined vector for signal SEL_EXCP, and the like. Signal RESET_REQ_S a reset signal that is asserted at the interrupt controller module 710 in response to a selectable exception being treated as a reset.

FIG. 6 illustrates a state diagram describing operation of a data processor including the elements of FIG. 5. The state diagram of FIG. 6 includes state node 510, state node 520, state node 530, state node 540, state node 550, transition indicator 5101, transition indicator 5102, transition indicator 5201, transition indicator 5401, transition indicator 5402, transition indicator 5501, and transition indicator 5301.

State node 510 represents any operating mode of a data processor except for exception processing modes otherwise illustrated at FIG. 6. An exception processing routine begins at either state node 520 or at state node 530 in response to a state occurring at state node 510 that indicates an authorized exception event has occurred. When the exception event is a fixed interrupt event or selectable exception event, the data processor will enter an exception processing mode of operation at state node 520 as represented by state indicator 5101. For example, assertion of EXCP_INT of FIG. 5 will cause the data processor 100 to enter interrupt processing mode of operation at state node 520. Alternatively, when the exception event is a fixed reset event the data processor will enter a reset processing mode of operation at state node 530 as indicated by state transition indicator 5102.

At state node 520 an exception processing routine is executed for both fixed interrupt events and selectable exception events, whether the selectable exception is identified as a reset or an interrupt. At portion 521 an exception processing routine invalidates various state information of data processor 100 in expectation of a change of instruction flow. State information can be invalidated by being replaced, e.g., by setting or clearing to specific logic states, or by asserting a flags that would indicate the state information is not valid and is not to be used. Portion 521 includes invalidating state information of pipeline 730. In one embodiment, only invisible state information 7311 of pipeline 730 is invalidated at portion 521, as this is information that is not observable to a user.

At portion 522 of the exception routine various state information of the data processor is saved in expectation of a change of instruction flow. For example, the program counter, status register, and other register information, such as data registers, is saved to facilitate returning, at a later time, to the instruction flow location where the selectable exception event occurred. In addition, the destination of a vector, as described below, can be saved.

At portion 523 of the exception routine the destination associated with a vector of an interrupt count or selectable exception event is determined. The destination can represent a vector location, an instruction location, and the like. The exception destination is based upon a vector, generally referred to as a vector or an interrupt. The destination is determined for a selectable exception event in response to a programmable indicator indicating the selectable exception event is a reset and in response to a programmable indicator indicating the selectable exception event is a reset. At portion 524, the program counter is set to the destination for a given architectural embodiment.

Upon completion of the exception routing associated with state node 520 the data processor 100 will continue exception processing at state node 540. At state node 540 the exception event is evaluated to determine whether it is an interrupt, or a selectable exception that is to be further treated as an interrupt or a reset. If the exception event being processed is a fixed interrupt, which can be indicated by an interrupt vector associated with the interrupt or by assertion of the interrupt at a specific interconnect, flow transitions to state node 510 where application instructions associated with a user defined interrupt handler are executed beginning at an address associated with the interrupt vector of the interrupt being processed. State transition indicator 5401 will also be taken to state node 510 if the exception event being processed is a selectable exception that is associated with a programmable indicator that indicates the event is to be treated as an interrupt. Alternatively, exception processing at the data processor continues as a reset at state node 550 in response to a selectable exception event being processed as a reset based upon a programmable indicator. For example, an interrupt event can have a bit associated with it at a programmable storage location, such as a register, that is set to a first logic value to indicate the selectable exception event is to be treated as a reset, and that is set to a second logic value to indicate the selectable exception event is to be treated as an interrupt. A default value of the register can be either logic state. Application software can facilitate storing a value at the programmable storage location. The value stored at the programmable storage location can be changed during operation of the data processor to change whether a selectable interrupt is treated as a reset or an interrupt.

At node 550, any processing specific to a selectable exception being handled as a reset exception is performed. For example, additional register information can be saved prior to entering reset mode of operation at state node 530. Upon completion of the exception routine of state node 550, reset processing commences at state node 530 as indicated by state transition indicator 5501.

At state node 530, with respect to a selectable interrupt being handled as a reset exception, a reset specific processing routine is executed. For example, the data processor 100 can implement haltable reset processing as previously described, or any other type of conventional or proprietary reset processing. Data processor 100 returns to normal operation at state node 510 upon completion of exception processing at state node 530. The exception processing at state node 530 is essentially equivalent to the state processing of state node 321 of FIG. 3.

FIG. 7 illustrates a state diagram that represents a more detailed view of state node 540 of FIG. 6. The state diagram of FIG. 7 assumes that state node 550 is a null state node, i.e., it does nothing. The diagram of FIG. 7 includes state node 5541, state node 5542, state node 5543, transition arrow 55411, transition arrow 55412, transition arrow 55431, transition arrow 5401, and transition arrow 55421. If a portion of the exception processing routine represented by node 5541 determines the current exception event is an interrupt event, whether a fixed interrupt event or a selectable interrupt event, flow proceeds to node 5542 of the data processor exception processing routine as indicated by state transition indicator 55411. If a portion of the exception processing routine represented by node 5541 determines the current exception event is a selectable exception identified as a reset, flow proceeds to node 5543 as indicated by transition arrow 55412.

At node 5543 of the data processor exception processing routine, operations unique to processing a selectable exception event as a reset event is generated. A reset event is generated by asserting signal RESET_REQ_S at the interrupt controller 710 of FIG. 5. Flow proceeds to state node 5542 after completion of the exception routine of state node 5543.

At node 5542 of the data processor exception processing routine a pause is implemented sufficiently long to provide time for the reset processing routine of state node 530 to take control. Therefore, before the pause implemented at state node 5542 was to expire, the reset signal asserted at state node 5543 will have resulted in control transitioning to state node 530. However, if an interrupt is to be processed, the pause will expire without reset processing being called and flow will proceed to state node 510 as indicated by transition arrow 5401.

Whether a selectable exception is to be treated as an interrupt or a reset can be indicated using programmable indicators as previously discussed. For example, each selectable exception event can have a register bit that can be programmed to indicate the event should be treated as either an interrupt or as a reset.

FIG. 8 illustrates a core 800 that can represent a specific embodiment of Core 110 of FIG. 1. Core 800 includes interrupt controller module 810, reset controller module 720, selectable exception controller module 840, and pipeline module 830.

Interrupt control module 810 is connected to the following nodes: a node that communicates a signal labeled ITRPT_EXT; a node that communicates a signal labeled ITRPT_INT; a node that communicates a signal labeled ITRPT_PIPE; a node that communicates a signal labeled ITRPT_CTL; a node that communicates a signal labeled PROCESS_ITRPT; and a node that communicates a signal ITRPT_PENDING. Signals having the same name as signals previously described operate in the same manner. In addition, interrupt control module 810 is connected to a node that communicates a signal labeled ITRPT_S.

Reset control module 820 is connected to the following nodes: a node that communicates a signal labeled RESET_EXT; a node that communicates a signal labeled RESET1_INT; a node that communicates a signal labeled RESET_PIPE; and a node that communicates a signal labeled RESET_CTL; a node that communicates a signal labeled RESET_S.

Selectable exception controller module 840 is connected to the following nodes: a node that communicates a signal labeled SEL_EXCP_EXT; a node that communicates a signal labeled SEL_EXCP_INT; the node that communicates the signal labeled RESET_S; the node that communicates the signal labeled ITRPT_S; and a node that communicates a signal labeled SEL_EXCP_PIPE.

Signals having the same name as a signal previously described perform the same function. Signal SEL_EXCP_INT is associated with a selectable exception event that is associated with an event that occurs internal to the data processor. Signal SELL_EXCP_EXT is associated with a selectable exception event that is associated with an event that occurs external to the data processor. Signal SEL_EXCP_PIPE is associated with a selectable exception event that is associated with an event that occurs internal to the data processor at the pipeline 830. Operation of core 800 is further described with reference to FIG. 10

FIG. 9 illustrates a state diagram describing operation of a data processor including a core, such as the core 800 of FIG. 8. The state diagram of FIG. 9 includes node 910, node 920, node 930, node 940, transition indicator 9101, transition indicator 9102, transition indicator 9103, transition indicator 9201, transition indicator 9301, transition indicator 9401, and transition indicator 9402.

Node 910 represents any state that a data processor can be in except for those state otherwise indicated at FIG. 9. In response to a fixed interrupt event, such as is indicated by the assertion of ITRPT_INT which is associated with a non-selectable interrupt event, exception processing control of the data processor will be handled to the interrupt routine of node 930 for interrupt processing as is indicated by transition indicator 9101. In response to the occurrence of a fixed reset event, such as is indicated by the assertion of RESET_INT which is associated with a non-selectable reset event, exception processing control of the data processor will be handled to the reset routine of node 920 for reset processing as is indicated by transition indicator 9102. In response to the occurrence of a selectable exception event, such as is indicated by the assertion of SEL_EXCP_INT which is associated with an internal event, exception processing control of the data processor will be handled by the selectable interrupt routine of node 940 as is indicated by transition indicator 9103.

At node 940 a programmable indicator associated with the selectable exception event is evaluated to determine whether the exception is to be further treated as an interrupt or a reset. In response to a selectable exception being identified as an interrupt, exception processing of the data processor will continue at node 930 as is indicated by transition indicator 9401. For example, by selectable exception controller 840 asserting signal ITRPT_S. This can be facilitated at core 900 by asserting signal SEL_ITRPT. In response to a selectable exception being identified as a reset, exception processing of the data processor will continue at state node 920 as is indicated by transition indicator 9402. For example, by selectable exception controller 840 asserting signal RESET_S.

Upon completion of the interrupt processing routine 930 of the data processor control returns to node 910 as indicated by transition arrow 9301. Upon completion of the reset processing routine 920 of the data processor control returns to node 910 as indicated by transition arrow 9201. The reset processing routine applied to a selectable exception at FIG. 9 that is treated as a reset is identical to the reset processing routine applied to a fixed reset. However, the reset processing routine applied to a selectable interrupt treated as a reset at FIG. 6 includes processing routine 520 associate with state node 520, which is not part of the reset processing routing applied to a fixed reset event.

In the foregoing specification, principles of the disclosure have been described with reference to specific embodiments. However, one of ordinary skill in the art appreciates that one or more modifications or one or more other changes can be made to any one or more of the embodiments without departing from the scope of the invention as set forth in the claims below. For example, while specific register bits have been associated with specific exceptions to enable a disclosed feature, it will be appreciated that a global register bit can be used that enables a disclosed feature for all exceptions of a specific type. For example, a single bit could cause all resets to be halted, or cause all selectable interrupts to be treated as one of an interrupt or a reset. In addition, events shown at a specific portion of an embodiment disclosed herein can occur at other locations.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method of processing an exception event at a data processor device comprising:
   setting a programmable indicator to one of a first state or a second state prior to the exception event;
   invalidating a first set of state information at the data processor in response to the exception event;
   responsive to the exception event and the programmable indicator being set to the first state:
      halting processing of the exception event;
      placing the data processor device in a debug mode subsequent to invalidating the first set of information; and
      maintaining a second set of state information at the data processor for use during the debug mode; and
   responsive to the exception event and the programmable indicator being set to the second state:
      invalidating the second set of state information; and
      continuing processing of the exception event to place the data processing device in a defined state.

2. The method of claim 1 further comprising:
   executing a debug operation subsequent to placing the data processor device in the debug mode, wherein the debug operation is executable only during the debug mode.

3. The method of claim 2 further comprising:
   resuming exception processing in response to executing the debug operation, where resuming exception processing places the data processor device in the defined state prior to completing exception processing.

4. The method of claim 1, further comprising initiating execution of application instructions at a defined location based upon the defined state.

5. The method of claim 1 wherein placing the data processor device in the defined state comprises replacing a set of information at the data processor with a defined set of information.

6. The method of claim 5 wherein continuing exception processing further comprises executing a debug routine at the data processor device subsequent to replacing the set of information to achieve the defined state based upon the defined set of information.

7. The method of claim 5 wherein the exception event is a first exception event, the programmable indicator is a first programmable indicator, and the method further comprises:
   setting a second programmable indicator to one of the first state or the second state prior to a second exception event;
   invalidating the first set of state information at the data processor at the data processor in response to the second exception event;
   responsive to the second exception event and the second programmable indicator being set to the first state:
      halting processing of the second exception event;
      placing the data processor device in the debug mode subsequent to invalidating the first set of information; and
      maintaining a third set of state information at the data processor for use during the debug mode; and
   responsive to the second exception event and the second programmable indicator being set to the second state:
      invalidating the third set of state information; and
      continuing processing of the second exception event to place the data processing device in the defined state.

8. The method of claim 7 wherein the first exception event is a reset exception.

9. The method of claim 8, wherein the reset exception is in response to a computer operating properly timeout.

10. The method of claim 8 wherein the second exception event is an interrupt exception.

11. The method of claim 7 wherein the exception event is in response to an illegal instruction or an illegal address being detected.

12. The method of claim 1 wherein the exception event is a first exception event, and the method further comprises:
   invalidating the first set of state information at the data processor in response to a second exception event; and
   placing a portion of the data processor device in the defined state in response to the second exception event and without determining whether a programmable indicator is in the first state or the second state.

13. The method of claim 12, wherein the second exception event is a power on reset exception event.

14. The method of claim 12, wherein continuing the exception processing comprises completing the exception process by the data processor at a state to initiate execution of application instructions at a defined location.

15. The method of claim 1, wherein setting the programmable indicator comprises programming a fuse.

16. In a data processor device comprising an integrated circuit, a method comprising:
   setting a programmable indicator of the data processor device to one of at least a first state or a second state prior to a reset exception;
   initiating exception processing at the data processor device in response to the reset exception;
   responsive to the exception event and the programmable indicator being set to the first state, halting the exception processing; and
   responsive to the exception event and the programmable indicator being set to the second state, continuing the exception processing without halting.

17. The method of claim 16, wherein halting execution comprises placing the data processor in a debug mode of operation.

18. The method of claim 16, wherein continuing the exception processing comprises placing a set of state information in a defined state.

19. A data processing device comprising:
   a first node of an integrated circuit to receive a signal indicating an exception event;
   a programmable indicator to be set to one of at least a first state or a second state prior to the exception event; and
   an exception processing module at the integrated circuit coupled to the first node to initiate execution of an exception processing routine in response to receiving the signal indicating the exception event, the exception processing module comprising:
      a first portion of the exception processing routine to implement a first function executed in response to receiving the signal indicating the occurrence of the exception event; and
      a second portion of the exception processing routine to be executed upon completion of the first portion to determine whether to halt operation of the data processing device based on the programmable indicator.

20. The data processor device of claim 19, wherein the exception processing module further comprises:
   a third portion of the exception processing routine to be executed in response to the second portion determining to halt the exception processing routine and execution of application instructions at the data processing device; and a fourth portion of the exception processing routine to be executed in response to the second portion determining not to halt the exception processing routine, the fourth portion continuing the exception processing routine by the data processor device.

21. The data processor device of claim 19, wherein the module is a first module, the signal is a first signal, the exception event is a first exception event, the exception processing routine is a first exception processing routine, the data processor device further comprising:

a second node of an integrated circuit to receive a second signal indicating a second exception event; and the exception processing module coupled to the second node to execute a second exception processing routine in response to receiving the second signal indicating the second exception event, the exception processing module further comprising a first portion of the second exception processing routine to implement the first function in response to receiving the second signal indicating the second exception event; and a second portion of the second exception processing routine to be executed subsequent to completion of the first portion of the second exception processing call to initiate execution of application instructions after placing the data processor in a defined state, the second portion to be executed without determining whether to halt operation of the second exception processing routine after execution of the first portion.

\* \* \* \* \*